United States Patent
Zou et al.

(10) Patent No.: US 12,378,629 B2
(45) Date of Patent: Aug. 5, 2025

(54) WIRE ROD FOR ULTRAHIGH-STRENGTH STEEL CORD AND MANUFACTURING METHOD THEREOF

(71) Applicants: INSTITUTE OF RESEARCH OF IRON AND STEEL, JIANGSU PROVINCE/SHA-STEEL, CO., LTD., Suzhou (CN); ZHANGJIAGANG RONGSHENG SPECIAL STEEL CO., LTD., Suzhou (CN); JIANGSU SHAGANG GROUP CO., LTD., Suzhou (CN)

(72) Inventors: Changdong Zou, Suzhou (CN); Han Ma, Suzhou (CN); Jiaqi Zhao, Suzhou (CN); Kui Shen, Suzhou (CN); Xiaofeng Cai, Suzhou (CN); Yixin Shi, Suzhou (CN); Yonglin Huang, Suzhou (CN)

(73) Assignees: INSTITUTE OF RESEARCH OF IRON AND STEEL, JIANGSU PROVINCE/SHA-STEEL, CO., LTD., Suzhou (CN); ZHANGJIAGANG RONGSHENG SPECIAL STEEL CO., LTD., Suzhou (CN); JIANGSU SHAGANG GROUP CO., LTD., Suzhou (CN)

(*) Notice: Subject to any disclaimer, the term of this patent is extended or adjusted under 35 U.S.C. 154(b) by 565 days.

(21) Appl. No.: 17/764,166

(22) PCT Filed: Oct. 17, 2019

(86) PCT No.: PCT/CN2019/111668
§ 371 (c)(1),
(2) Date: Mar. 25, 2022

(87) PCT Pub. No.: WO2021/056633
PCT Pub. Date: Apr. 1, 2021

(65) Prior Publication Data
US 2022/0340996 A1    Oct. 27, 2022

(30) Foreign Application Priority Data
Sep. 26, 2019   (CN) .......... 201910914918.X

(51) Int. Cl.
| | | |
|---|---|---|
| C21D 11/00 | (2006.01) | |
| B21B 1/46 | (2006.01) | |
| B21B 45/00 | (2006.01) | |
| B22D 11/115 | (2006.01) | |
| C21C 7/064 | (2006.01) | |

(Continued)

(52) U.S. Cl.
CPC .......... *C21D 11/005* (2013.01); *B21B 1/463* (2013.01); *B21B 45/004* (2013.01); *B22D 11/115* (2013.01); *C21C 7/064* (2013.01); *C21C 7/068* (2013.01); *C21C 7/10* (2013.01); *C21D 6/004* (2013.01); *C21D 6/005* (2013.01); *C21D 6/008* (2013.01); *C21D 8/065* (2013.01); *C21D 9/525* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01)

(58) Field of Classification Search
CPC ...... C21D 11/005; C21D 6/004; C21D 6/005; C21D 6/008; C21D 8/06; C21D 59/525; C21D 9/52; C21D 8/065; C21D 9/525; B21B 1/463; B21B 45/004; B21B 37/00; B21B 37/48; B21B 37/74; B21B 2265/12; B21B 1/18; C21C 7/064; C21C 7/068; C21C 7/10; C21C 7/06; C21C 7/072; C21C 7/076; C22C 38/001; C22C 38/002; C22C 38/008; C22C 38/02; C22C 38/04; C22C 38/06; C22C 38/42; C22C 38/44; C22C 38/46; C22C 38/48; C22C 38/50; C22C 33/04; C22C 38/60; B22D 11/115; B32B 15/013
USPC ....................................................... 148/541
See application file for complete search history.

(56) References Cited

U.S. PATENT DOCUMENTS 6,596,098 B1 * 7/2003 Nishida .................. C22C 38/04
                                                        148/333

FOREIGN PATENT DOCUMENTS

| CN | 102676948 A | 9/2012 |
|---|---|---|
| CN | 103014524 A | 4/2013 |

(Continued)

OTHER PUBLICATIONS

CN106591700A Translation (Year: 2017).*

*Primary Examiner* — Danielle M. Carda
(74) *Attorney, Agent, or Firm* — MUNCY, GEISSLER, OLDS & LOWE, P.C.

(57) ABSTRACT

The present invention discloses a wire rod for an ultrahigh-strength steel cord and a manufacturing method thereof. The manufacturing method includes: smelting molten steel where inclusions in sizes ≥5 μm are at a number density ≤0.5/mm² and sizes of inclusions are ≤30 μm; casting the molten steel into an ingot blank with a center carbon segregation value of 0.92-1.08; cogging the ingot blank into an intermediate blank with a center carbon segregation value of 0.95-1.05; rolling the intermediate blank into a wire rod; and performing temperature control cooling on the wire rod to obtain a wire rod with high purity, high homogeneity and tensile strength ≤1,150 MPa. The wire rod may be used for an ultrahigh-strength steel cord with single tensile strength ≥3,600 MPa.

19 Claims, No Drawings

(51) Int. Cl.
*C21C 7/068* (2006.01)
*C21C 7/10* (2006.01)
*C21D 6/00* (2006.01)
*C21D 8/06* (2006.01)
*C21D 9/52* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)

(56) References Cited

FOREIGN PATENT DOCUMENTS

| | | | | |
|---|---|---|---|---|
| CN | 104451413 A | | 3/2015 | |
| CN | 106591700 A | * | 4/2017 | ............ B22D 11/16 |
| CN | 108796166 A | | 11/2018 | |
| CN | 110230008 A | | 9/2019 | |
| JP | S53-2330 A | | 1/1978 | |
| KR | 1995-0007785 B1 | | 1/1995 | |
| KR | 10-2012-0071587 A | | 7/2012 | |

* cited by examiner

WIRE ROD FOR ULTRAHIGH-STRENGTH STEEL CORD AND MANUFACTURING METHOD THEREOF

CROSS REFERENCE TO RELATED APPLICATIONS

The present application is a 35 U.S.C. § 371 National Phase conversion of International (PCT) Patent Application No. PCT/CN2019/111668, filed on Oct. 17, 2019, which claims priority to Chinese Patent Application No. 201910914918.X, filed on Sep. 26, 2019 and tiled "Wire Rod for Ultrahigh-strength Steel Cord and Manufacturing Method Thereof", which is incorporated herein by reference in its entirety. The PCT International Patent Application was filed and published in Chinese.

TECHNICAL FIELD

The present invention belongs to the technical field of iron and steel smelting, and relates to a wire rod for producing an ultrahigh-strength steel cord and a manufacturing method thereof.

BACKGROUND

In recent years, domestic automobiles have developed rapidly, and the automobile production and sales of China have ranked first in the world. It has been found that the fuel consumption of an automobile is correspondingly almost halved if the overall weight thereof is halved. For present requirements on environmental protection and energy conservation, lightweight automobile has become a world trend of automobile development nowadays.

Steel cord is a main frame work material for meridian lines of automobile tires. The weight of an automobile tire may be reduced by 10% when the strength of the steel cord is improved by a level. Therefore, demands for ultrahigh-strength steel cords are increasing with the development of automobiles to a lightweight direction.

At present, wire rods for producing ultrahigh-strength steel cords are all high-strength wire rods. In practice, the strength of a manufactured steel cord is usually ensured by improving the strength of a wire rod so as to meet a requirement for ultrahigh strength of the steel cord. However, these high-strength wire rods have the problems of high drawing fracture rate, relatively high stranding fracture rate, high mold loss, low yield, etc.

SUMMARY

An objective of the present invention is to provide a wire rod for producing an ultrahigh-strength steel cord and a manufacturing method thereof.

In order to achieve the above-mentioned object, an embodiment of the present invention provides a manufacturing method for a wire rod for an ultrahigh-strength steel cord, wherein the wire rod comprises the following chemical components in percentage by mass: 0.78%-0.96% of C, 0.15%-0.30% of Si, 0.30%-0.60% of Mn, ≤0.02% of P, ≤0.02% of S, ≤0.004% of Al, ≤0.001% of Ti, ≤0.005% of N, ≤0.50% of Cr, ≤0.05% of Ni, ≤0.05% of Cu, ≤0.01% of Mo, ≤0.10% of Nb, ≤0.10% of V, ≤0.01% of Sn, ≤0.02% of Pb, and the balance of Fe and other inevitable impurities, the manufacturing method sequentially comprising the following steps:

a steel smelting stage: smelting molten steel where inclusions in sizes ≥5 μm are at a number density ≤0.5/mm$^2$ and sizes of inclusions are ≤30 μm;

a blank casting stage: casting tapped molten steel of the steel smelting stage into an ingot blank with a center carbon segregation value of 0.92-1.08;

a cogging stage: cogging the ingot blank into an intermediate blank with a center carbon segregation value of 0.95-1.05;

a rolling stage: rolling the intermediate blank into a wire rod; and a controlled cooling stage: performing temperature control cooling on the wire rod to obtain a wire rod with tensile strength ≤1,150 MPa.

As an improvement of the embodiment of the present invention, the steel smelting stage sequentially comprises molten iron desulphurization, furnace primary smelting, external refining and inclusion removal; and in the furnace primary smelting procedure, no other slag formers but a carburant, ferrosilicon and manganese are sequentially added during tapping, and 90% or more of slag on a surface of the tapped molten steel is removed after tapping.

As an improvement of the embodiment of the present invention, dephosphorization and decarburization are performed using a converter or an electric furnace before tapping in the furnace primary smelting procedure;

when dephosphorization and decarburization are performed using the converter, a weight of molten iron is 85%-95% of a total charge weight, dephosphorization is performed at first to obtain semi-steel molten iron containing ≤0.03% of P, then decarburization is performed, and the molten steel is controlled to be at a temperature ≥1,680° C. and contain ≤0.015% of P and ≥0.2% of C; and when dephosphorization and decarburization are performed using the electric furnace, the weight of the molten iron is 50%-90% of the total charge weight, and after dephosphorization and decarburization, the molten steel is controlled to be at a temperature ≥1,650° C. and contain ≤0.015% of P and ≥0.5% of C.

As an improvement of the embodiment of the present invention, the external refining procedure sequentially comprises:

adjusting chemical components and temperature of the molten steel;

adding a refining covering agent to a surface of the molten steel according to a proportion of 8-12 kg/t, and melting the refining covering agent in an energized state to make a content of $SiO_2$ in the inclusions of the molten steel ≥40%; and removing the inclusions in the molten steel by soft stirring or vacuum refining.

As an improvement of the embodiment of the present invention, the step of "adjusting chemical components and temperature of the molten steel" and the step of "adding a refining covering agent to a surface of the molten steel according to a proportion of 8-12 kg/t, and melting the refining covering agent in an energized state to make a content of $SiO_2$ in the inclusions of the molten steel ≥40%" are performed in a ladle furnace (LF); and after the refining covering agent is added to the surface of the molten steel according to the proportion of 8-12 kg/t, a ladle bottom argon blowing intensity of the LF is controlled to be ≤0.005 Nm$^3$/(t·min) to make the content of $SiO_2$ in the inclusions of the molten steel ≥40%, a content of CaO ≤30% and a content of $Al_2O_3$ ≤10%.

As an improvement of the embodiment of the present invention, in the step of "removing the inclusions in the molten steel by soft stirring or vacuum refining":

when the inclusions in the molten steel are removed by soft stirring, a ladle bottom argon blowing intensity of an LF is controlled to be 0.001 $Nm^3/(t \cdot min)$-0.005 $Nm^3/(t \cdot min)$, soft stirring time is ≥30 minutes, and then killing treatment is performed for 15-20 minutes;

when the inclusions are removed by vacuum refining through an RH vacuum furnace, the molten steel is treated for 15-25 minutes in a high vacuum environment with a vacuum degree ≤1.5 mbar in a vacuum chamber of the RH vacuum furnace, and then killing treatment is performed for 10-15 minutes; and when the inclusions are removed by vacuum refining through a vacuum decarburization (VD)/vacuum oxygen decarburization (VOD) furnace, the molten steel is treated for 15-25 minutes in a high vacuum environment with a vacuum degree ≤1.5 mbar in a vacuum chamber of the VD/VOD furnace, a ladle bottom argon blowing intensity of the VD/VOD furnace being 0.001 $Nm^3/(t \cdot min)$-0.005 $Nm^3/(t \cdot min)$, and then killing treatment is performed for 20-30 minutes.

As an improvement of the embodiment of the present invention, in the inclusion removal procedure, tapped molten steel obtained by external refining is transferred to a tundish with an electromagnetic induction heating function, the inclusions in the molten steel are removed under an electromagnetic centrifugal force, so as to obtain molten steel where inclusions in sizes ≥5 μm are at a number density ≤0.5/$mm^2$ and sizes of inclusions are ≤30 μm.

As an improvement of the embodiment of the present invention, in the inclusion removal procedure, an electromagnetic induction coil is controlled to achieve a voltage of 200-1,500 V, a frequency of 300-800 Hz and a maximum heating rate of 3° C./min.

As an improvement of the embodiment of the present invention, a superheat degree of the tapped molten steel of the steel smelting stage is 15-25° C.; and in the blank casting stage, the tapped molten steel of the steel smelting stage is poured into a continuous casting device to be processed into a continuously cast blank, a crystallizer of the continuous casting device has an electromagnetic stirring function so as to electromagnetically stir the poured molten steel, and an array withdrawal straightener and fan section of the continuous casting device are used for forming the continuously cast blank.

As an improvement of the embodiment of the present invention, in the blank casting stage, the crystallizer is controlled to achieve a current of 500 A-800 A and a frequency of 1 Hz-5 Hz, and the array withdrawal straightener has a single-roll reduction ≥5 mm, a total reduction ≥30 mm, the total reduction being controlled to be 10 mm-30 mm during implementation, and a total reduction ratio of 3%-10%.

As an improvement of the embodiment of the present invention, the cogging stage sequentially comprises a heating procedure and a continuous rolling cogging procedure, so as to cog the ingot blank into the intermediate blank with the center carbon segregation value of 0.95-1.05.

As an improvement of the embodiment of the present invention, in the heating procedure, the ingot blank is transferred to a heating furnace to be heated for 100-150 minutes, a temperature of the heating furnace is controlled to be 1,000-1,200° C., a whole heating process is divided into a preheating section, a heating section and a soaking section at a temperature ≥1,080° C., and the ingot blank is kept in the soaking section for 30-60 minutes; and in the continuous rolling cogging procedure, high-pressure water dephosphorization is performed under dephosphorization pressure of 10-14 MPa after the ingot blank leaves the heating furnace, then the ingot blank is alternatively and continuously rolled into the intermediate blank by a horizontal and vertical alternative continuous rolling mill of 2-9 passes, the ingot blank is at a temperature of 980-1,080° C. before entering a rolling mill of the first pass, and the intermediate blank is cooled and tapped.

As an improvement of the embodiment of the present invention, the rolling stage sequentially comprises a heating procedure and a high-speed rolling procedure, so as to roll the intermediate blank into the wire rod.

As an improvement of the embodiment of the present invention, in the heating procedure, the intermediate blank is transferred to a heating furnace to be heated for 90-150 minutes, a temperature of the heating furnace is controlled to be 1,000-1,150° C., and the intermediate blank is kept in a soaking section at a temperature ≥1,050° C. for 30-60 minutes; and in the high-speed rolling procedure, high-pressure water dephosphorization is performed under dephosphorization pressure of 9-14 MPa after the intermediate blank leaves the heating furnace, then the intermediate blank is rolled into the wire rod by a high-speed mill, an initial rolling temperature is controlled to be 950-1,050° C., a finish rolling temperature is controlled to be 900-940° C., a silking temperature is controlled to be 900-940° C., and a maximum rolling speed is controlled to be 110 m/s.

As an improvement of the embodiment of the present invention, in the controlled cooling stage, temperature control cooling is performed on the wire rod at a cooling rate of 8-18 K/s, the cooling rate is reduced to 4-8 K/s after cooling to 600° C., and the obtained wire rod has no network cementite or martensite abnormal structures in the center, and has tensile strength ≤1,150 MPa.

As an improvement of the embodiment of the present invention, in the controlled cooling stage, temperature control cooling is performed on the wire rod using a Stelmor cooling line, a roll table speed of the Stelmor cooling line is controlled to be ≤1.05 m/s, $1^{st}$-$6^{th}$ fans are turned on, and maximum openings of the $3^{rd}$-$6^{th}$ fans are controlled to be 50% to keep the cooling rate at 8-18 K/s; and a coil collection temperature is controlled to be ≤450° C., and the wire rod enters a power and free (PF) line to be naturally cooled after coil collection.

As an improvement of the embodiment of the present invention, in the controlled cooling stage, the roll table speed of the Stelmor cooling line is controlled to be 0.7-0.9 m/s, a heat preservation cover at a section of the Stelmor cooling line with the $1^{st}$ fan is closed, and best openings of the $3^{rd}$-$6^{th}$ fans are sequentially 20-50%, 10-40%, 30% or less, and 20% or less respectively.

In order to achieve the above-mentioned object, an embodiment of the present invention provides a wire rod for an ultrahigh-strength steel cord, wherein the wire rod is manufactured by any one embodiment of the manufacturing methods above mentioned.

Compared with the related art, the present invention has the following beneficial effects: the purity and homogeneity of a wire rod are controlled to obtain a low-strength wire rod with high purity, high homogeneity and tensile strength ≤1,150 MPa. The wire rod may be used for manufacturing an ultrahigh-strength steel cord with single tensile strength ≥3,600 MPa. The problems including high drawing fracture rate, relatively high stranding fracture rate, high mold loss and low yield during the processing of a wire rod into a steel cord may be solved, and a relatively low drawing fracture rate, stranding fracture rate and mold loss and a relatively high yield may be ensured. Moreover, a wire rod with low tensile strength is low in drawing energy consumption and easy to draw when processed into a steel cord, and ultrahigh-strength steel cords may further be promoted on large scale to achieve a purpose of reducing weights of automobile tires.

DETAILED DESCRIPTION

An implementation of the present invention provides a manufacturing method for a wire rod for an ultrahigh-strength steel cord as well as a wire rod for an ultrahigh-strength steel cord manufactured by the manufacturing method. That is, the wire rod may be a base material for manufacturing an ultrahigh-strength steel cord. Specifically, the wire rod may be processed into an ultrahigh-strength steel cord with single tensile strength ≥3,600 MPa by conventional procedures of drawing, heat treatment, zinc/copper plating, etc.

The wire rod includes the following chemical components in percentage by mass: 0.78%-0.96% of C, 0.15%-0.30% of Si, 0.30%-0.60% of Mn, ≤0.02% of P, ≤0.02% of S, ≤0.004% of Al, ≤0.001% of Ti, ≤0.005% of N, ≤0.50% of Cr, ≤0.05% of Ni, ≤0.05% of Cu, ≤0.01% of Mo, ≤0.10% of Nb, ≤0.10% of V, ≤0.01% of Sn, ≤0.02% of Pb, and the balance of Fe and other inevitable impurities.

In a preferred implementation, the manufacturing method for a wire rod sequentially includes a steel smelting stage, a blank casting stage, a cogging stage, a rolling stage, and a controlled cooling stage. The steps in the manufacturing method will now be specifically introduced one by one.

(1) The Steel Smelting Stage

Molten steel where inclusions in sizes ≥5 μm are at a number density ≤0.5/mm$^2$ and sizes of inclusions are ≤30 μm is smelted. As such, the purity of the molten steel is controlled to ensure high purity of a finally manufactured wire rod.

Preferably, the steel smelting stage sequentially includes procedures of molten iron desulphurization, furnace primary smelting, external refining, inclusion removal, etc.

In the molten iron desulphurization procedure, blast furnace molten iron is desulphurized in a Kambara Reactor (KR) desulphurization apparatus. A content of S in the desulphurized molten iron is ≤0.002%.

In the furnace primary smelting procedure, dephosphorization and decarburization are performed at first on the molten iron subjected to the molten iron desulphurization procedure using a converter or an electric furnace. Specifically, when dephosphorization and decarburization are performed using the converter, a weight of the molten iron is 85%-95% of a total charge weight, and a weight of corresponding scrap steel is 15%-5% of the total charge weight. Dephosphorization is performed at first until a content of P in semi-steel molten iron is ≤0.03%. Then, decarburization is performed. After decarburization, the molten steel is controlled to contain ≤0.015% of P and ≥0.2% of C and be at a temperature ≥1,680° C. When dephosphorization and decarburization are performed using the electric furnace, a weight of the molten iron is 50%-90% of a total charge weight, and a weight of corresponding scrap steel is 50%-10% of the total charge weight. After decarburization, the molten steel contains ≤0.015% of P and ≥0.5% of C and be at a temperature ≥1,650° C. Afterwards, no other slag formers but a carburant, ferrosilicon and manganese are sequentially added during tapping, and 90% or more of slag on a surface of tapped molten steel is removed after tapping. The tapping process is practically a process of deoxidation alloying and slag formation and removal. Compared with adding a slag former but removing no slag during tapping in the prior art, removing slag and forbidding the addition of any slag former may contribute to controlling a content of $SiO_2$ in the inclusions and reducing the severe fluctuation and uncontrollability of components of the inclusions in the molten steel as well as contents of CaO and $Al_2O_3$ in the inclusions.

The external refining procedure sequentially includes the following operations. First, chemical components and temperature of tapped molten steel of the furnace primary smelting procedure are adjusted in a ladle furnace (LF) such that the chemical components and temperature of the molten steel are adjusted to target ranges rapidly. Specifically, the temperature of the molten steel is adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, a refining covering agent is added to a surface of the molten steel in the LF according to a proportion of 8-12 kg/t, and the LF is rapidly energized and kept in an energized state for 5-10 minutes to melt the refining covering agent, thereby further effectively controlling the contents of the components in the inclusions. Finally, the inclusions in the molten steel are removed by soft stirring or vacuum refining.

Preferably, after the refining covering agent is added to the surface of the molten steel in the LF according to the proportion of 8-12 kg/t, a ladle bottom argon blowing intensity of the LF is controlled to be ≤0.005 Nm$^3$/(t·min). Therefore, the influence of the refining covering agent on the accurate control of the components of the inclusions is reduced, and the reaction of the slag and the molten steel is inhibited.

As mentioned above, the tapping process during furnace primary smelting, the refining covering agent and bottom argon blowing during external refining and the like are controlled so as to make the content of $SiO_2$ in the inclusions of the molten steel ≥40%, the content of CaO ≤30% and the content of $Al_2O_3$≤10%.

When the inclusions in the molten steel are removed by soft stirring, a ladle bottom argon blowing intensity of an LF is controlled to be 0.001 Nm$^3$/(t·min)-0.005 Nm$^3$/(t·min), and soft stirring and killing treatment are sequentially performed. Total time for soft stirring and killing treatment is ≥45 minutes. Preferably, soft stirring time is ≥30 minutes, and killing treatment time is 15-20 minutes. When the inclusions are removed by vacuum refining through an RH vacuum furnace, the molten steel is treated for 15-25 minutes in a high vacuum environment with a vacuum degree ≤1.5 mbar in a vacuum chamber of the RH vacuum furnace, and then killing treatment is performed for 10-15 minutes. When the inclusions are removed by vacuum refining through a vacuum decarburization (VD)/vacuum oxygen decarburization (VOD) furnace, the molten steel is treated for 15-25 minutes in a high vacuum environment with a vacuum degree ≤1.5 mbar in a vacuum chamber of the VD/VOD furnace, a ladle bottom argon blowing intensity of the VD/VOD furnace being 0.001 Nm$^3$/(t·min)-0.005 Nm$^3$/(t·min), and then killing treatment is performed for 20-30 minutes.

In the inclusion removal procedure, preferably, tapped molten steel obtained by external refining is transferred to a tundish with an electromagnetic induction heating function, and the inclusions in the molten steel are removed under an electromagnetic centrifugal force to further purify the molten steel so as to obtain molten steel where inclusions in sizes ≥5 μm are at a number density ≤0.5/mm² and sizes of inclusions are ≤25 μm. More preferably, in the inclusion removal procedure, an electromagnetic induction coil is controlled to achieve a voltage of 200-1,500 V, a frequency of 300-800 Hz and a maximum heating rate of 3° C./min.

Tapped molten steel of the inclusion removal procedure is the tapped molten steel of the steel smelting stage. After the inclusion removal procedure, the molten steel satisfies the conditions that inclusions in sizes ≥5 μm are at a number density ≤0.5/mm², sizes of inclusions are ≤30 μm and the content of $SiO_2$ in the inclusions is ≥40%, and is high-purity molten steel.

(2) The Blank Casting Stage

Tapped molten steel of the steel smelting stage is cast into an ingot blank with a center carbon segregation value of 0.92-1.08. As such, the homogeneity of the steel blank is controlled to ensure high homogeneity of the finally manufactured wire rod.

Preferably, in the inclusion removal procedure of the steel smelting stage, a superheat degree of the tapped molten steel of the steel smelting stage is 15-25° C. under the electromagnetic induction heating effect of the tundish with the electromagnetic induction heating function. Furthermore, the low-superheat-degree molten steel is cast into the ingot blank with the center carbon segregation value of 0.92-1.08. Therefore, the ingot blank is controlled to have relatively high homogeneity.

The tapped molten steel of the steel smelting stage is poured into a continuous casting device to be processed into a continuously cast blank in the blank casting stage. A crystallizer of the continuous casting device has an electromagnetic stirring function so as to electromagnetically stir the poured molten steel to improve the proportion of equiaxed grains of the continuously cast blank. More preferably, the crystallizer is controlled to achieve a current of 500 A-800 A and a frequency of 1 Hz-5 Hz so as to improve the proportion of equiaxed grains of the continuously cast blank by 10% compared the prior art. Moreover, the continuous casting device uses an array withdrawal straightener and fan section capable of keeping a large reduction, thereby effectively controlling the center porosity and center segregation of the continuously cast blank. Preferably, the array withdrawal straightener of the continuous casting device has a single-roll reduction ≥5 mm, a total reduction ≥30 mm, the total reduction being controlled to be 10 mm-30 mm during implementation, and a total reduction ratio of 3%-10%. Therefore, a continuously cast blank with a center carbon segregation value of 0.92-1.08 is obtained.

(3) The Cogging Stage

The ingot blank obtained in the blank casting stage is cogged into an intermediate blank with a center carbon segregation value of 0.95-1.05. Preferably, the cogging stage sequentially includes a heating procedure and a continuous rolling cogging procedure, so as to cog the ingot blank into the intermediate blank with the center carbon segregation value of 0.95-1.05. As such, the homogeneity of the steel blank is further controlled to ensure higher homogeneity of the finally manufactured wire rod.

In the heating procedure, the ingot blank obtained in the blank casting stage is transferred to a first heating furnace to be heated for 100-150 minutes. A temperature of the first heating furnace is controlled to be 1,000-1,200° C. A whole heating process is divided into a preheating section, a heating section and a soaking section at a temperature ≥1,080° C. The ingot blank is kept in the soaking section for 30-60 minutes. Therefore, the ingot blank is further homogenized to improve the homogeneity.

In the continuous rolling cogging procedure, high-pressure water dephosphorization is performed under dephosphorization pressure of 10-14 MPa after the ingot blank leaves the first heating furnace. Then, the ingot blank is alternatively and continuously rolled into a 130 mm×130 mm-200 mm×200 mm intermediate blank by a horizontal and vertical alternative continuous rolling mill of 2-9 passes. The ingot blank is at a temperature of 980-1,080° C. before entering a rolling mill of the first pass. The intermediate blank is cooled and tapped. Therefore, the obtained intermediate blank has a center carbon segregation value of 0.95-1.05, and is a high-homogeneity blank. Of course, a sectional shape and size of the intermediate blank are not limited thereto.

(4) The Rolling Stage

Tapped steel of the cogging stage, i.e., the intermediate blank, is rolled into a wire rod.

Preferably, the rolling stage sequentially includes a heating procedure and a high-speed rolling procedure.

In the heating procedure, the intermediate blank is transferred to a second heating furnace to be heated for 90-150 minutes. A temperature of the second heating furnace is controlled to be 1,000-1,150° C. The intermediate blank is kept in a soaking section at a temperature ≥1,050° C. for 30-60 minutes. The intermediate blank may be further homogenized in this process.

In the high-speed rolling procedure, high-pressure water dephosphorization is performed under dephosphorization pressure of 9-14 MPa after the intermediate blank leaves the second heating furnace. Then, the intermediate blank is rolled into the wire rod by a high-speed mill. An initial rolling temperature is controlled to be 950-1,050° C., a finish rolling temperature is controlled to be 900-940° C., a silking temperature is controlled to be 900-940° C., and a maximum rolling speed is controlled to be 110 m/s.

(5) The Controlled Cooling Stage

Temperature control cooling is performed on the wire rod obtained by rolling in the rolling stage to finally obtain a wire rod with tensile strength ≤1,150 MPa. As mentioned above, the wire rod may be used for manufacturing an ultrahigh-strength steel cord with single tensile strength ≥3,600 MPa. Compared with a wire rod for an ultrahigh-strength steel cord with tensile strength ≥3,600 MPa in the prior art, the wire rod of the present implementation is lower in tensile strength and higher in homogeneity and purity. A low drawing fracture rate, stranding fracture rate and mold loss and a high yield are ensured in a production process of manufacturing a steel cord. The wire rod is low in energy consumption and easy to draw in a drawing process due to lower tensile strength.

Preferably, in the controlled cooling stage, temperature control cooling is performed on the wire rod at a cooling rate of 8-18 K/s. The cooling rate is reduced to 4-8 K/s after cooling to 600° C. The obtained wire rod has no network cementite or martensite abnormal structures in the center, and has tensile strength ≤1,150 MPa.

Specifically, in the controlled cooling stage, temperature control cooling is performed on the wire rod using a Stelmor cooling line. A roll table speed of the Stelmor cooling line is controlled to be ≤1.05 m/s. $1^{st}$-$6^{th}$ fans are turned on. Maximum openings of the $3^{rd}$-$6^{th}$ fans are controlled to be 50% to keep the cooling rate at 8-18 K/s. A coil collection temperature is controlled to be ≤450° C. The wire rod enters a power and free (PF) line to be naturally cooled after coil collection.

Further, in the controlled cooling stage, the roll table speed of the Stelmor cooling line is controlled to be 0.7-0.9 m/s. A heat preservation cover at a section of the Stelmor cooling line with the $1^{st}$ fan is closed. Best openings of the $3^{rd}$-$6^{th}$ fans are sequentially 20-50%, 10-40%, 30% or less, and 20% or less respectively.

In summary, according to the present implementation, the purity and homogeneity of a wire rod are controlled to obtain a low-strength wire rod with high purity, high homogeneity and tensile strength ≤1,150 MPa. The wire rod may be used for manufacturing an ultrahigh-strength steel cord with single tensile strength ≥3,600 MPa. Compared with a wire rod for an ultrahigh-strength steel cord with single tensile strength ≥3,600 MPa in the prior art, the wire rod of the present implementation is lower in tensile strength. The problems including high drawing fracture rate, relatively high stranding fracture rate, high mold loss and low yield during the processing of a wire rod into a steel cord may be solved, and a relatively low drawing fracture rate, stranding fracture rate and mold loss and a relatively high yield may be ensured. Moreover, a wire rod with low tensile strength is low in drawing energy consumption and easy to draw when processed into a steel cord, and ultrahigh-strength steel cords may further be promoted on large scale to achieve a purpose of reducing weights of automobile tires.

The technical solution of this application is further described below with reference to some specific embodiments.

Embodiment 1

(1) The Steel Smelting Stage

Molten steel where inclusions in sizes ≥5 μm are at a number density of $0.5/mm^2$ and sizes of inclusions are ≤30 μm is obtained sequentially by molten iron desulphurization, furnace primary smelting, external refining and inclusion removal. A specific process is as follows.

In the molten iron desulphurization procedure, 111 t of blast furnace molten iron at a temperature T of 1,374° C. and containing 0.38% of Si and 0.035% of S is added to a KR desulphurization apparatus for desulphurization. The molten steel contains 0.001% of S after desulphurization.

In the furnace primary smelting procedure, the molten iron obtained in the molten iron desulphurization procedure together with 18 t of clean scrap steel is first added to a 120 t converter for dephosphorization and decarburization. Specifically, oxygen-blown desiliconization and dephosphorization is performed in the converter, lime, light-burned dolomite, pellets and the like are added for slag forming, slag alkalinity being controlled to be 2.0, semi-steel molten iron containing 0.032% of P and 0.001% of Si is obtained by blowing at a temperature controlled to be 1,420° C. or lower, and early desiliconization and dephosphorization slag is poured out by shaking the converter. Then, oxygen-blown decarburization is performed, lime, light-burned dolomite, pellets and the like are added again for slag forming, end-point slag alkalinity being controlled to be 3.5, and molten steel at a temperature T of 1,680° C. and containing 0.015% of P and 0.62% of C is obtained by blowing.

In the external refining procedure, tapped molten steel of the furnace primary smelting procedure is delivered to an LF at first, and chemical components and temperature of the molten steel are rapidly adjusted to target ranges in the LF. Specifically, the temperature of the molten steel may be adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, inclusions in the molten steel are removed by soft stirring, and killing treatment is performed after soft stirring. Total time for soft stirring and killing treatment is 45 minutes.

In the inclusion removal procedure, tapped molten steel obtained by external refining is transferred to a tundish with an electromagnetic induction heating function. A heating rate is controlled to be 3° C./min, and a superheat degree is controlled to be 25° C. The inclusions float under an electromagnetic centrifugal force. High-purity molten steel where inclusions in sizes ≥5 μm are at a number density of $0.5/mm^2$ and sizes of inclusions are ≤30 μm is finally obtained.

(2) The Blank Casting Stage

The tapped molten steel of the steel smelting stage is cast into a continuously cast blank with a center carbon segregation value of 1.08. A specific process is as follows. The molten steel with the superheat degree of 25° C. obtained in the tundish with the electromagnetic induction heating function is poured into a continuous casting device to be processed into a continuously cast blank. A crystallizer of the continuous casting device has an electromagnetic stirring function so as to electromagnetically stir the poured molten steel to improve the proportion of equiaxed grains of the continuously cast blank. Specifically, the crystallizer is controlled to achieve a current of 800 A and a frequency of 4 Hz. Moreover, the continuous casting device uses an array withdrawal straightener and fan section capable of keeping a large reduction, thereby effectively controlling the center porosity and center segregation of the continuously cast blank. The array withdrawal straightener of the continuous casting device is controlled to achieve a single-roll reduction of 5 mm, a total reduction of 30 mm and a total reduction ratio of 10%. Therefore, a highly pure and homogeneous continuously cast blank with a center carbon segregation value of 1.08 is finally obtained.

(3) The Cogging Stage

The continuously cast blank obtained in the blank casting stage is cogged into a highly pure and homogeneous intermediate blank with a center carbon segregation value of 1.02. A specific process is as follows.

In a first heating procedure, the continuously cast blank obtained in the blank casting stage is transferred to a first heating furnace for heating. A temperature of the first heating furnace is controlled to be 1,150° C. Total heating time is 100 minutes. A whole heating process is divided into a preheating section, a heating section and a soaking section at a temperature ≥1,080° C. The continuously cast blank is kept in the soaking section for 60 minutes. Therefore, diffusion heat treatment is performed on the continuously cast blank to further homogenize the continuously cast blank to improve the homogeneity.

In a continuous rolling cogging procedure, high-pressure water dephosphorization is performed under dephosphorization pressure of 10 MPa after the continuously cast blank leaves the first heating furnace. Then, the continuously cast blank is alternatively and continuously rolled into a 180 mm×180 mm square intermediate blank by a horizontal and vertical alternative continuous rolling mill of 5 passes. The continuously cast blank is at a temperature of 1,080° C. before entering a rolling mill of the first pass. The intermediate blank is tapped after sequential natural cooling and flaw detection coping, thereby obtaining the intermediate blank with the center carbon segregation value of 1.02.

(4) The Rolling Stage

Tapped steel of the cogging stage, i.e., the intermediate blank, is rolled into a wire rod. A specific process is as follows.

In a second heating procedure, the intermediate blank is transferred to a second heating furnace to be heated for 90 minutes. A temperature of the second heating furnace is controlled to be 1,150° C. The intermediate blank is kept in a soaking section at a temperature ≥1,050° C. for 60 minutes. The intermediate blank may be further homogenized in this process.

In a high-speed rolling procedure, high-pressure water dephosphorization is performed under dephosphorization pressure of 14 MPa after the intermediate blank leaves the second heating furnace. Then, the intermediate blank is rolled into the wire rod by a high-speed mill. An initial rolling temperature is controlled to be 1,050° C., a finish rolling temperature is controlled to be 940° C., a silking temperature is controlled to be 940° C., and a maximum rolling speed is controlled to be 110 m/s.

The second heating furnace and the first heating furnace may be the same heating furnace or two heating furnaces independent of each other.

(5) The Controlled Cooling Stage

Temperature control cooling is performed on the wire rod obtained by rolling in the rolling stage to finally obtain a high-purity, high-homogeneity and low-strength wire rod with tensile strength of 1,150 MPa. A specific process is as follows. The wire rod obtained by rolling in the rolling stage enters a Stelmor cooling line for temperature control cooling after leaving a silking machine. A roll table speed of the Stelmor cooling line is controlled to be 0.8 m/s. $1^{st}$-$6^{th}$ fans are turned on. A heat preservation cover at a section of the Stelmor cooling line with the $1^{st}$ fan is closed. Openings of the $3^{rd}$-$6^{th}$ fans are controlled to be sequentially 50%, 40%, 30% and 20%. Moreover, a coil collection temperature is controlled to be 450° C. The wire rod enters a PF line to be naturally cooled after coil collection, so as to finally obtain the high-purity, high-homogeneity and low-strength wire rod with the tensile strength of 1,150 MPa.

The wire rod manufactured in the present embodiment is measured to include the following chemical components in percentage by mass: 0.78% of C, 0.15% of Si, 0.30% of Mn, 0.02% of P, 0.015% of S, 0.004% of Al, 0.001% of Ti, 0.005% of N, 0.50% of Cr, 0.05% of Ni, 0.05% of Cu, 0.01% of Mo, 0.10% of Nb, 0.10% of V, 0.01% of Sn, 0.02% of Pb, and the balance of Fe and other inevitable impurities.

It can be seen from the above that, in the wire rod, the inclusions in sizes ≥5 μm are at a number density of 0.5/mm², and sizes of the inclusions are ≤30 μm. In addition, the center carbon segregation value of the intermediate blank for producing the wire rod is 1.02. Moreover, the tensile strength of the wire rod is 1,150 MPa.

Furthermore, the wire rod of the present embodiment is obtained by existing procedures of drawing, heat treatment, zinc/copper plating, etc., so that an ultrahigh-strength steel cord with single tensile strength of 3,600 MPa may further be deeply processed, and low drawing fracture rate, low stranding fracture rate, low mold loss, high yield and the ease of drawing operations are ensured during deep processing.

Embodiment 2

(1) The Steel Smelting Stage

Molten steel where inclusions in sizes ≥5 μm are at a number density of 0.45/mm² and sizes of inclusions are ≤28 μm is obtained sequentially by molten iron desulphurization, furnace primary smelting, external refining and inclusion removal. A specific process is as follows.

In the molten iron desulphurization procedure, 109 t of blast furnace molten iron at a temperature T of 1,362° C. and containing 0.40% of Si and 0.032% of S is added to a KR desulphurization apparatus for desulphurization. The molten steel contains 0.001% of S after desulphurization.

In the furnace primary smelting procedure, the molten iron obtained in the molten iron desulphurization procedure together with 19 t of clean scrap steel is first added to a 120 t converter for dephosphorization and decarburization. Specifically, oxygen-blown desiliconization and dephosphorization is performed in the converter, lime, light-burned dolomite, pellets and the like are added for slag forming, slag alkalinity being controlled to be 2.1, semi-steel molten iron containing 0.035% of P and 0.0008% of Si is obtained by blowing at a temperature controlled to be 1,420° C. or lower, and early desiliconization and dephosphorization slag is poured out by shaking the converter. Then, oxygen-blown decarburization is performed, lime, light-burned dolomite, pellets and the like are added again for slag forming, end-point slag alkalinity being controlled to be 3.6, and molten steel at a temperature T of 1,688° C. and containing 0.013% of P and 0.54% of C is obtained by blowing.

In the external refining procedure, tapped molten steel of the furnace primary smelting procedure is delivered to an LF at first, and chemical components and temperature of the molten steel are rapidly adjusted to target ranges in the LF. Specifically, the temperature of the molten steel may be adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, inclusions in the molten steel are removed by soft stirring, and killing treatment is performed after soft stirring. Total time for soft stirring and killing treatment is 48 minutes.

In the inclusion removal procedure, tapped molten steel obtained by external refining is transferred to a tundish with an electromagnetic induction heating function. A heating rate is controlled to be 3° C./min, and a superheat degree is controlled to be 20° C. The inclusions float under an electromagnetic centrifugal force. High-purity molten steel where inclusions in sizes ≥5 μm are at a number density of 0.45/mm² and sizes of inclusions are ≤28 μm is finally obtained.

(2) The Blank Casting Stage

The tapped molten steel of the steel smelting stage is cast into a continuously cast blank with a center carbon segregation value of 0.92. A specific process is as follows. The molten steel with the superheat degree of 20° C. obtained in the tundish with the electromagnetic induction heating function is poured into a continuous casting device to be processed into a continuously cast blank. A crystallizer of the continuous casting device has an electromagnetic stirring function so as to electromagnetically stir the poured molten steel to improve the proportion of equiaxed grains of the continuously cast blank. Specifically, the crystallizer is controlled to achieve a current of 800 A and a frequency of 4 Hz. Moreover, the continuous casting device uses an array withdrawal straightener and fan section capable of keeping a large reduction, thereby effectively controlling the center porosity and center segregation of the continuously cast blank. The array withdrawal straightener of the continuous casting device is controlled to achieve a single-roll reduction of 5 mm, a total reduction of 30 mm and a total reduction ratio of 10%. Therefore, a highly pure and homogeneous continuously cast blank with a center carbon segregation value of 0.92 is finally obtained.

(3) The Cogging Stage

The continuously cast blank obtained in the blank casting stage is cogged into a highly pure and homogeneous intermediate blank with a center carbon segregation value of 1.05. A specific process is as follows.

In a first heating procedure, the continuously cast blank obtained in the blank casting stage is transferred to a first heating furnace for heating. A temperature of the first heating furnace is controlled to be 1,000° C. Total heating time is 150 minutes. A whole heating process is divided into a preheating section, a heating section and a soaking section at a temperature ≥1,100° C. The continuously cast blank is kept in the soaking section for 52 minutes. Therefore, diffusion heat treatment is performed on the continuously cast blank to further homogenize the continuously cast blank to improve the homogeneity.

In a continuous rolling cogging procedure, high-pressure water dephosphorization is performed under dephosphorization pressure of 10 MPa after the continuously cast blank leaves the first heating furnace. Then, the continuously cast blank is alternatively and continuously rolled into a 130 mm×130 mm square intermediate blank by a horizontal and vertical alternative continuous rolling mill of 9 passes. The continuously cast blank is at a temperature of 980° C. before entering a rolling mill of the first pass. The intermediate blank is tapped after sequential natural cooling and flaw detection coping, thereby obtaining the intermediate blank with the center carbon segregation value of 1.05.

(4) The Rolling Stage

Tapped steel of the cogging stage, i.e., the intermediate blank, is rolled into a wire rod. A specific process is as follows.

In a second heating procedure, the intermediate blank is transferred to a second heating furnace to be heated for 150 minutes. A temperature of the second heating furnace is controlled to be 1,000° C. The intermediate blank is kept in a soaking section at a temperature ≥1,056° C. for 52 minutes. The intermediate blank may be further homogenized in this process.

In a high-speed rolling procedure, high-pressure water dephosphorization is performed under dephosphorization pressure of 9-14 MPa after the intermediate blank leaves the second heating furnace. Then, the intermediate blank is rolled into the wire rod by a high-speed mill. An initial rolling temperature is controlled to be 950° C., a finish rolling temperature is controlled to be 900° C., a silking temperature is controlled to be 900° C., and a maximum rolling speed is controlled to be 110 m/s.

The second heating furnace and the first heating furnace may be the same heating furnace or two heating furnaces independent of each other.

(5) The Controlled Cooling Stage

Temperature control cooling is performed on the wire rod obtained by rolling in the rolling stage to finally obtain a high-purity, high-homogeneity and low-strength wire rod with tensile strength of 1,139 MPa. A specific process is as follows. The wire rod obtained by rolling in the rolling stage enters a Stelmor cooling line for temperature control cooling after leaving a silking machine. A roll table speed of the Stelmor cooling line is controlled to be 0.8 m/s. $1^{st}$-$6^{th}$ fans are turned on. A heat preservation cover at a section of the Stelmor cooling line with the $1^{st}$ fan is closed. Openings of the $3^{rd}$-$6^{th}$ fans are controlled to be sequentially 20%, 10%, 25% or less and 15%. Moreover, a coil collection temperature is controlled to be 430° C. The wire rod enters a PF line to be naturally cooled after coil collection, so as to finally obtain the high-purity, high-homogeneity and low-strength wire rod with the tensile strength of 1,139 MPa.

The wire rod manufactured in the present embodiment is measured to include the following chemical components in percentage by mass: 0.87% of C, 0.15% of Si, 0.30% of Mn, 0.015% of P, 0.015% of S, 0.003% of Al, 0.0008% of Ti, 0.005% of N, 0.48% of Cr, 0.05% of Ni, 0.05% of Cu, 0.01% of Mo, 0.10% of Nb, 0.10% of V, 0.01% of Sn, 0.02% of Pb, and the balance of Fe and other inevitable impurities.

It can be seen from the above that, in the wire rod, the inclusions in sizes ≥5 μm are at a number density of 0.45/mm², and sizes of the inclusions are ≤28 μm. In addition, the center carbon segregation value of the intermediate blank for producing the wire rod is 1.05. Moreover, the tensile strength of the wire rod is 1,150 MPa.

Furthermore, the wire rod of the present embodiment is obtained by existing procedures of drawing, heat treatment, zinc/copper plating, etc., so that an ultrahigh-strength steel cord with single tensile strength of 3,641 MPa may further be deeply processed, and low drawing fracture rate, low stranding fracture rate, low mold loss, high yield and the ease of drawing operations are ensured during deep processing.

Embodiment 3

(1) The Steel Smelting Stage

Molten steel where inclusions in sizes ≥5 μm are at a number density of 0.38/mm² and sizes of inclusions are ≤24 μm is obtained sequentially by molten iron desulphurization, furnace primary smelting, external refining and inclusion removal. A specific process is as follows.

In the molten iron desulphurization procedure, 109 t of blast furnace molten iron at a temperature T of 1,369° C. and containing 0.38% of Si and 0.036% of S is added to a KR desulphurization apparatus for desulphurization. The molten steel contains 0.001% of S after desulphurization.

In the furnace primary smelting procedure, the molten iron obtained in the molten iron desulphurization procedure together with 19 t of clean scrap steel is first added to a 120 t converter for dephosphorization and decarburization. Specifically, oxygen-blown desiliconization and dephosphorization is performed in the converter, lime, light-burned dolomite, pellets and the like are added for slag forming, slag alkalinity being controlled to be 1.9, semi-steel molten iron containing 0.033% of P and 0.001% of Si is obtained by blowing at a temperature controlled to be 1,420° C. or lower, and early desiliconization and dephosphorization slag is poured out by shaking the converter. Then, oxygen-blown decarburization is performed, lime, light-burned dolomite, pellets and the like are added again for slag forming, end-point slag alkalinity being controlled to be 3.3, and molten steel at a temperature T of 1,692° C. and containing 0.012% of P and 0.50% of C is obtained by blowing.

In the external refining procedure, tapped molten steel of the furnace primary smelting procedure is delivered to an LF at first, and chemical components and temperature of the molten steel are rapidly adjusted to target ranges in the LF. Specifically, the temperature of the molten steel may be adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, inclusions in the molten steel are removed by soft stirring, and killing treatment is performed after soft stirring. Total time for soft stirring and killing treatment is 49 minutes.

In the inclusion removal procedure, tapped molten steel obtained by external refining is transferred to a tundish with an electromagnetic induction heating function. A heating rate is controlled to be 3° C./min, and a superheat degree is controlled to be 15° C. The inclusions float under an electromagnetic centrifugal force. High-purity molten steel where inclusions in sizes ≥5 μm are at a number density of 0.38/mm² and sizes of inclusions are ≤24 μm is finally obtained.

(2) The Blank Casting Stage

The tapped molten steel of the steel smelting stage is cast into a continuously cast blank with a center carbon segregation value of 1.02. A specific process is as follows. The molten steel with the superheat degree of 15° C. obtained in the tundish with the electromagnetic induction heating function is poured into a continuous casting device to be processed into a continuously cast blank. A crystallizer of the continuous casting device has an electromagnetic stirring function so as to electromagnetically stir the poured molten steel to improve the proportion of equiaxed grains of the continuously cast blank. Specifically, the crystallizer is controlled to achieve a current of 800 A and a frequency of 4 Hz. Moreover, the continuous casting device uses an array withdrawal straightener and fan section capable of keeping a large reduction, thereby effectively controlling the center porosity and center segregation of the continuously cast blank. The array withdrawal straightener of the continuous casting device is controlled to achieve a single-roll reduction of 5 mm, a total reduction of 30 mm and a total reduction ratio of 10%. Therefore, a highly pure and homogeneous continuously cast blank with a center carbon segregation value of 1.02 is finally obtained.

(3) The Cogging Stage

The continuously cast blank obtained in the blank casting stage is cogged into a highly pure and homogeneous intermediate blank with a center carbon segregation value of 1.02. A specific process is as follows.

In a first heating procedure, the continuously cast blank obtained in the blank casting stage is transferred to a first heating furnace for heating. A temperature of the first heating furnace is controlled to be 1,000° C. Total heating time is 150 minutes. A whole heating process is divided into a preheating section, a heating section and a soaking section at a temperature ≥1,120° C. The continuously cast blank is kept in the soaking section for 52 minutes. Therefore, diffusion heat treatment is performed on the continuously cast blank to further homogenize the continuously cast blank to improve the homogeneity.

In a continuous rolling cogging procedure, high-pressure water dephosphorization is performed under dephosphorization pressure of 10 MPa after the continuously cast blank leaves the first heating furnace. Then, the continuously cast blank is alternatively and continuously rolled into a 130 mm×130 mm square intermediate blank by a horizontal and vertical alternative continuous rolling mill of 9 passes. The continuously cast blank is at a temperature of 980° C. before entering a rolling mill of the first pass. The intermediate blank is tapped after sequential natural cooling and flaw detection coping, thereby obtaining the intermediate blank with the center carbon segregation value of 1.02.

(4) The Rolling Stage

Tapped steel of the cogging stage, i.e., the intermediate blank, is rolled into a wire rod. A specific process is as follows.

In a second heating procedure, the intermediate blank is transferred to a second heating furnace to be heated for 150 minutes. A temperature of the second heating furnace is controlled to be 1,000° C. The intermediate blank is kept in a soaking section at a temperature ≥1,056° C. for 52 minutes. The intermediate blank may be further homogenized in this process.

In a high-speed rolling procedure, high-pressure water dephosphorization is performed under dephosphorization pressure of 12.8 MPa after the intermediate blank leaves the second heating furnace. Then, the intermediate blank is rolled into the wire rod by a high-speed mill. An initial rolling temperature is controlled to be 950° C., a finish rolling temperature is controlled to be 900° C., a silking temperature is controlled to be 900° C., and a maximum rolling speed is controlled to be 110 m/s.

The second heating furnace and the first heating furnace may be the same heating furnace or two heating furnaces independent of each other.

(5) The Controlled Cooling Stage

Temperature control cooling is performed on the wire rod obtained by rolling in the rolling stage to finally obtain a high-purity, high-homogeneity and low-strength wire rod with tensile strength of 1,142 MPa. A specific process is as follows. The wire rod obtained by rolling in the rolling stage enters a Stelmor cooling line for temperature control cooling after leaving a silking machine. A roll table speed of the Stelmor cooling line is controlled to be 0.8 m/s. $1^{st}$-$6^{th}$ fans are turned on. A heat preservation cover at a section of the Stelmor cooling line with the $1^{st}$ fan is closed. Openings of the $3^{rd}$-$6^{th}$ fans are controlled to be sequentially 30%, 20%, 20% and 10%. Moreover, a coil collection temperature is controlled to be 440° C. The wire rod enters a PF line to be naturally cooled after coil collection, so as to finally obtain the high-purity, high-homogeneity and low-strength wire rod with the tensile strength of 1,142 MPa.

The wire rod manufactured in the present embodiment is measured to include the following chemical components in percentage by mass: 0.96% of C, 0.30% of Si, 0.60% of Mn, 0.010% of P, 0.012% of S, 0.003% of Al, 0.0006% of Ti, 0.003% of N, 0.46% of Cr, 0.05% of Ni, 0.05% of Cu, 0.01% of Mo, 0.10% of Nb, 0.10% of V, 0.01% of Sn, 0.02% of Pb, and the balance of Fe and other inevitable impurities.

It can be seen from the above that, in the wire rod, the inclusions in sizes ≥5 μm are at a number density of 0.38/mm², and sizes of the inclusions are ≤24 μm. In addition, the center carbon segregation value of the intermediate blank for producing the wire rod is 1.02. Moreover, the tensile strength of the wire rod is 1,142 MPa.

Furthermore, the wire rod of the present embodiment is obtained by existing procedures of drawing, heat treatment, zinc/copper plating, etc., so that an ultrahigh-strength steel cord with single tensile strength of 3,628 MPa may further be deeply processed, and low drawing fracture rate, low stranding fracture rate, low mold loss, high yield and the ease of drawing operations are ensured during deep processing.

Embodiment 4

(1) The Steel Smelting Stage

Molten steel where inclusions in sizes ≥5 μm are at a number density of 0.5/mm² and sizes of inclusions are ≤30 μm is obtained sequentially by molten iron desulphurization, furnace primary smelting, external refining and inclusion removal. A specific process is as follows.

In the molten iron desulphurization procedure, molten iron at a temperature T of 1,374° C. and containing 0.38% of Si and 0.035% of S is added to a KR desulphurization apparatus for desulphurization. The molten steel contains 0.0015% of S after desulphurization.

In the furnace primary smelting procedure, 82.5 t of molten iron obtained in the molten iron desulphurization procedure together with 27.5 t of clean scrap steel is first added to a 100 t electric furnace for dephosphorization and decarburization. Specifically, oxygen-blown desiliconization and dephosphorization and energized heating are performed in the electric furnace, lime, light-burned dolomite, pellets and the like are added for slag forming, slag alkalinity being controlled to be 3.5, and molten steel at a temperature T of 1,650° C. and containing 0.015% of P and 0.50% of C is obtained. Then, no other slag formers but a carburant, ferrosilicon and manganese are sequentially added during tapping, and 90% of slag on a surface of the tapped molten steel is removed after tapping. Afterwards, the tapped molten steel enters the external refining procedure.

In the external refining procedure, molten steel obtained by slag removal in the furnace primary smelting procedure is delivered to an LF at first, and chemical components and temperature of the molten steel are rapidly adjusted to target ranges in the LF. Specifically, the temperature of the molten steel may be adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, a refining covering agent is added to the surface of the molten steel in the LF according to a proportion of 8 kg/t, and the LF is rapidly energized and kept in an energized state for 5 minutes to melt the refining covering agent. A ladle bottom argon blowing intensity of the LF is controlled to be ≤0.005 Nm³/(t·min) to further make a content of $SiO_2$ in the inclusions of the molten steel 40%. Finally, the inclusions in the molten steel are removed by soft stirring. The ladle bottom argon blowing intensity of the LF is controlled to be 0.003 Nm³/(t·min). Soft stirring time is 30 minutes. Then, killing treatment is performed for 15 minutes.

In the inclusion removal procedure, tapped molten steel obtained by external refining is transferred to a tundish with an electromagnetic induction heating function. An electromagnetic induction coil is controlled to achieve a voltage of 200 V, a frequency of 300 Hz and a heating rate of 1° C./min. A superheat degree is 22-25° C. The molten steel is further purified under an electromagnetic centrifugal force.

Finally, high-purity molten steel is obtained. In the molten steel, inclusions in sizes ≥5 μm are at a number density of 0.5/mm², sizes of inclusions are ≤30 and the inclusions contain ≥40% of $SiO_2$, ≤30% of CaO and ≤10% of $Al_2O_3$.

(2) The Blank Casting Stage

The tapped molten steel of the steel smelting stage is cast into a continuously cast blank with a center carbon segregation value of 1.05. A specific process is as follows. The molten steel with the superheat degree of 22-25° C. obtained in the tundish with the electromagnetic induction heating function is poured into a continuous casting device to be processed into a continuously cast blank. A crystallizer of the continuous casting device has an electromagnetic stirring function so as to electromagnetically stir the poured molten steel to improve the proportion of equiaxed grains of the continuously cast blank. Specifically, the crystallizer is controlled to achieve a current of 500 A and a frequency of 1 Hz. Moreover, the continuous casting device uses an array withdrawal straightener and fan section capable of keeping a large reduction, thereby effectively controlling the center porosity and center segregation of the continuously cast blank. An implemented total reduction is 10 mm, and a total reduction ratio is 3%. Therefore, a highly pure and homogeneous continuously cast blank with a center carbon segregation value of 1.05 is finally obtained.

(3) The Cogging Stage

The continuously cast blank obtained in the blank casting stage is cogged into a highly pure and homogeneous intermediate blank with a center carbon segregation value of 1.02. A specific process is as follows.

In a first heating procedure, the continuously cast blank obtained in the blank casting stage is transferred to a first heating furnace for heating. A temperature of the first heating furnace is controlled to be 1,150° C. Total heating time is 100 minutes. A whole heating process is divided into a preheating section, a heating section and a soaking section at a temperature ≥1,080° C. The continuously cast blank is kept in the soaking section for 60 minutes. Therefore, diffusion heat treatment is performed on the continuously cast blank to further homogenize the continuously cast blank to improve the homogeneity.

In a continuous rolling cogging procedure, high-pressure water dephosphorization is performed under dephosphorization pressure of 10 MPa after the continuously cast blank leaves the first heating furnace. Then, the continuously cast blank is alternatively and continuously rolled into a 180 mm×180 mm square intermediate blank by a horizontal and vertical alternative continuous rolling mill of 5 passes. The continuously cast blank is at a temperature of 1,080° C. before entering a rolling mill of the first pass. The intermediate blank is naturally cooled and tapped, thereby obtaining the intermediate blank with the center carbon segregation value of 1.02.

(4) The Rolling Stage

Tapped steel of the cogging stage, i.e., the intermediate blank, is rolled into a wire rod. A specific process is as follows.

In a second heating procedure, the intermediate blank is transferred to a second heating furnace to be heated for 90 minutes. A temperature of the second heating furnace is controlled to be 1,150° C. The intermediate blank is kept in a soaking section at a temperature ≥1,050° C. for 60 minutes. The intermediate blank may be further homogenized in this process.

In a high-speed rolling procedure, high-pressure water dephosphorization is performed under dephosphorization pressure of 14 MPa after the intermediate blank leaves the second heating furnace. Then, the intermediate blank is rolled into the wire rod by a high-speed mill. An initial rolling temperature is controlled to be 1,050° C., a finish rolling temperature is controlled to be 940° C., a silking temperature is controlled to be 920° C., and a maximum rolling speed is controlled to be 110 m/s.

The second heating furnace and the first heating furnace may be the same heating furnace or two heating furnaces independent of each other.

(5) The Controlled Cooling Stage

Temperature control cooling is performed on the wire rod obtained by rolling in the rolling stage to finally obtain a high-purity, high-homogeneity and low-strength wire rod with no network cementite abnormal structures in the center and tensile strength of 1,050 MPa. A specific process is as follows. The wire rod obtained by rolling in the rolling stage enters a Stelmor cooling line for temperature control cooling after leaving a silking machine. A roll table speed of the Stelmor cooling line is controlled to be 0.8 m/s. $1^{st}$-$6^{th}$ fans are turned on. A heat preservation cover at a section of the Stelmor cooling line with the $1^{st}$ fan is closed. Openings of the $3^{rd}$-$6^{th}$ fans are controlled to be sequentially 30%, 20%, 15% and 10% to keep the cooling rate at 8 K/s. Moreover, a coil collection temperature is controlled to be 450° C. The wire rod enters a PF line to be naturally cooled after coil collection, so as to finally obtain the high-purity, high-homogeneity and low-strength wire rod with no network cementite abnormal structures in the center and the tensile strength of 1,050 MPa.

The wire rod manufactured in the present embodiment is measured to include the following chemical components in percentage by mass: 0.78% of C, 0.15% of Si, 0.30% of Mn, 0.02% of P, 0.015% of S, 0.004% of Al, 0.001% of Ti, 0.005% of N, 0.50% of Cr, 0.05% of Ni, 0.05% of Cu, 0.01% of Mo, 0.10% of Nb, 0.10% of V, 0.01% of Sn, 0.02% of Pb, and the balance of Fe and other inevitable impurities.

It can be seen from the above that, in the wire rod, the inclusions in sizes ≥5 μm are at a number density of 0.45/mm², and sizes of the inclusions are ≤28 μm. In addition, the center carbon segregation value of the intermediate blank for producing the wire rod is 1.05. Moreover, the tensile strength of the wire rod is 1,139 MPa.

Furthermore, the wire rod of the present embodiment is obtained by existing procedures of drawing, heat treatment, zinc/copper plating, etc., so that an ultrahigh-strength steel cord with single tensile strength of 3,600 MPa may further be deeply processed, and low drawing fracture rate, low stranding fracture rate, low mold loss, high yield and the ease of drawing operations are ensured during deep processing.

Embodiment 5

(1) The Steel Smelting Stage

Molten steel where inclusions in sizes ≥5 μm are at a number density of 0.3/mm² and sizes of inclusions are ≤30 μm is obtained sequentially by molten iron desulphurization, furnace primary smelting, external refining and inclusion removal. A specific process is as follows.

In the molten iron desulphurization procedure, molten iron at a temperature T of 1,300° C. and containing 0.45% of Si and 0.030% of S is added to a KR desulphurization apparatus for desulphurization. The molten steel contains 0.002% of S after desulphurization.

In the furnace primary smelting procedure, 117 t of molten iron obtained in the molten iron desulphurization procedure together with 13 t of clean scrap steel is first added to a 120 t converter for dephosphorization and decarburization. Specifically, oxygen-blown desiliconization and dephosphorization is performed in the converter, lime, light-burned dolomite, pellets and the like are added for slag forming, slag alkalinity being controlled to be 2.0, semi-steel molten iron containing 0.025% of P and at a temperature T of 1,400° C. is obtained by blowing, and 60% of early desiliconization and dephosphorization slag is poured out by shaking the converter. Then, oxygen-blown decarburization is performed, lime, light-burned dolomite, pellets and the like are added again for slag forming, end-point slag alkalinity being controlled to be 4.0, and molten steel containing 0.012% of P and 0.30% of C and at a temperature T of 1,680° C. is obtained by blowing. Then, no other slag formers but a carburant, ferrosilicon and manganese are sequentially added during tapping, and 93% of slag on a surface of the tapped molten steel is removed after tapping. Afterwards, the tapped molten steel enters the external refining procedure.

In the external refining procedure, molten steel obtained by slag removal in the furnace primary smelting procedure is delivered to an LF at first, and chemical components and temperature of the molten steel are rapidly adjusted to target ranges in the LF. Specifically, the temperature of the molten steel may be adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, a refining covering agent is added to the surface of the molten steel in the LF according to a proportion of 10 kg/t, and the LF is rapidly energized and kept in an energized state for 8 minutes to melt the refining covering agent to further make a content of $SiO_2$ in the inclusions of the molten steel 45%. Finally, the inclusions in the molten steel are removed by vacuum refining through an RH vacuum furnace, the molten steel is treated for 15 minutes in a high vacuum environment with a vacuum degree ≤1.5 mbar in a vacuum chamber of the RH vacuum furnace, and then killing treatment is performed for 15 minutes.

In the inclusion removal procedure, tapped molten steel obtained by external refining is transferred to a tundish with an electromagnetic induction heating function. An electromagnetic induction coil is controlled to achieve a voltage of 250 V, a frequency of 400 Hz and a heating rate of 2° C./min. A superheat degree is 20-23° C. The molten steel is further purified under an electromagnetic centrifugal force.

Finally, high-purity molten steel is obtained. In the molten steel, inclusions in sizes ≥5 μm are at a number density of 0.3/mm², sizes of inclusions are ≤30 and the inclusions contain ≥45% of $SiO_2$, ≤30% of CaO and ≤10% of $Al_2O_3$.

(2) The Blank Casting Stage

The tapped molten steel of the steel smelting stage is cast into a continuously cast blank with a center carbon segregation value of 1.06. A specific process is as follows. The molten steel with the superheat degree of 20-23° C. obtained in the tundish with the electromagnetic induction heating function is poured into a continuous casting device to be processed into a continuously cast blank. A crystallizer of the continuous casting device has an electromagnetic stirring function so as to electromagnetically stir the poured molten steel to improve the proportion of equiaxed grains of the continuously cast blank. Specifically, the crystallizer is controlled to achieve a current of 600 A and a frequency of 1.5 Hz. Moreover, the continuous casting device uses an array withdrawal straightener and fan section capable of keeping a large reduction, thereby effectively controlling the center porosity and center segregation of the continuously cast blank. An implemented total reduction is 18 mm, and a total reduction ratio is 6%. Therefore, a highly pure and homogeneous continuously cast blank with a center carbon segregation value of 1.06 is finally obtained.

(3) The Cogging Stage

The continuously cast blank obtained in the blank casting stage is cogged into a highly pure and homogeneous intermediate blank with a center carbon segregation value of 1.03. A specific process is as follows.

In a first heating procedure, the continuously cast blank obtained in the blank casting stage is transferred to a first heating furnace for heating. A temperature of the first heating furnace is controlled to be 1,120° C. Total heating time is 120 minutes. A whole heating process is divided into a preheating section, a heating section and a soaking section at a temperature ≥1,100° C. The continuously cast blank is kept in the soaking section for 45 minutes. Therefore, diffusion heat treatment is performed on the continuously cast blank to further homogenize the continuously cast blank to improve the homogeneity.

In a continuous rolling cogging procedure, high-pressure water dephosphorization is performed under dephosphorization pressure of 12 MPa after the continuously cast blank leaves the first heating furnace. Then, the continuously cast blank is alternatively and continuously rolled into a 140 mm×140 mm square intermediate blank by a horizontal and vertical alternative continuous rolling mill of 9 passes. The continuously cast blank is at a temperature of 1,050° C. before entering a rolling mill of the first pass. The intermediate blank is naturally cooled and tapped, thereby obtaining the intermediate blank with the center carbon segregation value of 1.03.

(4) The Rolling Stage

Tapped steel of the cogging stage, i.e., the intermediate blank, is rolled into a wire rod. A specific process is as follows.

In a second heating procedure, the intermediate blank is transferred to a second heating furnace to be heated for 120 minutes. A temperature of the second heating furnace is controlled to be 1,100° C. The intermediate blank is kept in a soaking section at a temperature ≥1,080° C. for 45 minutes. The intermediate blank may be further homogenized in this process.

In a high-speed rolling procedure, high-pressure water dephosphorization is performed under dephosphorization pressure of 12 MPa after the intermediate blank leaves the second heating furnace. Then, the intermediate blank is rolled into the wire rod by a high-speed mill. An initial rolling temperature is controlled to be 1,030° C., a finish rolling temperature is controlled to be 920° C., a silking temperature is controlled to be 900° C., and a maximum rolling speed is controlled to be 100 m/s.

The second heating furnace and the first heating furnace may be the same heating furnace or two heating furnaces independent of each other.

(5) The Controlled Cooling Stage

Temperature control cooling is performed on the wire rod obtained by rolling in the rolling stage to finally obtain a high-purity, high-homogeneity and low-strength wire rod with no network cementite abnormal structures in the center and tensile strength of 1,100 MPa. A specific process is as follows. The wire rod obtained by rolling in the rolling stage enters a Stelmor cooling line for temperature control cooling after leaving a silking machine. A roll table speed of the Stelmor cooling line is controlled to be 0.9 m/s. $1^{st}$-$6^{th}$ fans are turned on. A heat preservation cover at a section of the Stelmor cooling line with the $1^{st}$ fan is closed. Openings of the $3^{rd}$-$6^{th}$ fans are controlled to be sequentially 40%, 35%, 25% and 15% to keep the cooling rate at 12 K/s. Moreover, a coil collection temperature is controlled to be 430° C. The wire rod enters a PF line to be naturally cooled after coil collection, so as to finally obtain the high-purity, high-homogeneity and low-strength wire rod with no network cementite abnormal structures in the center and the tensile strength of 1,100 MPa.

The wire rod manufactured in the present embodiment is measured to include the following chemical components in percentage by mass: 0.82% of C, 0.15% of Si, 0.50% of Mn, 0.012% of P, 0.01% of S, 0.002% of Al, 0.0005% of Ti, 0.002% of N, 0.01% of Cr, 0.02% of Ni, 0.02% of Cu, 0.005% of Mo, 0.01% of Nb, 0.02% of V, 0.005% of Sn, 0.01% of Pb, and the balance of Fe and other inevitable impurities.

It can be seen from the above that, in the wire rod, the inclusions in sizes ≥5 μm are at a number density of $0.3/mm^2$, sizes of the inclusions are ≤30 μm, and the inclusions contain ≥45% of $SiO_2$, ≤30% of CaO and ≤10% of $Al_2O_3$. In addition, the center carbon segregation value of the intermediate blank for producing the wire rod is 1.03. Moreover, the wire rod has no network cementite abnormal structures in the center, and has the tensile strength of 1,100 MPa.

Furthermore, the wire rod of the present embodiment is obtained by existing procedures of drawing, heat treatment, zinc/copper plating, etc., so that an ultrahigh-strength steel cord with single tensile strength of 3,720 MPa may further be deeply processed, and low drawing fracture rate, low stranding fracture rate, low mold loss, high yield and the ease of drawing operations are ensured during deep processing.

Embodiment 6

(1) The Steel Smelting Stage

Molten steel where inclusions in sizes ≥5 μm are at a number density of $0.2/mm^2$ and sizes of inclusions are ≤30 μm is obtained sequentially by molten iron desulphurization, furnace primary smelting, external refining and inclusion removal. A specific process is as follows.

In the molten iron desulphurization procedure, molten iron at a temperature T of 1,320° C. and containing 0.45% of Si and 0.030% of S is added to a KR desulphurization apparatus for desulphurization. The molten steel contains 0.001% of S after desulphurization.

In the furnace primary smelting procedure, 188 t of molten iron obtained in the molten iron desulphurization procedure together with 10 t of clean scrap steel is first added to a 180 t converter for dephosphorization and decarburization. Specifically, oxygen-blown desiliconization and dephosphorization is performed in the converter, lime, light-burned dolomite, pellets and the like are added for slag forming, slag alkalinity being controlled to be 2.2, semi-steel molten iron containing 0.026% of P and at a temperature T of 1,400° C. is obtained by blowing, and 70% of early desiliconization and dephosphorization slag is poured out by shaking the converter. Then, oxygen-blown decarburization is performed, lime, light-burned dolomite, pellets and the like are added again for slag forming, end-point slag alkalinity being controlled to be 4.0, and molten steel containing 0.01% of P and 0.30% of C and at a temperature T of 1,690° C. is obtained by blowing. Then, no other slag formers but a carburant, ferrosilicon and manganese are sequentially added during tapping, and 95% of slag on a surface of the tapped molten steel is removed after tapping. Afterwards, the tapped molten steel enters the external refining procedure.

In the external refining procedure, molten steel obtained by slag removal in the furnace primary smelting procedure is delivered to an LF at first, and chemical components and temperature of the molten steel are rapidly adjusted to target ranges in the LF. Specifically, the temperature of the molten steel may be adjusted to a target range by energized temperature control, components of the tapped molten steel sample of the furnace primary smelting procedure are measured, and then carbon powder and an alloy are supplemented according to component results to adjust the chemical components of the molten steel to target ranges. Then, a refining covering agent is added to the surface of the molten steel in the LF according to a proportion of 12 kg/t, and the LF is rapidly energized and kept in an energized state for 10 minutes to melt the refining covering agent to further make a content of $SiO_2$ in the inclusions of the molten steel 50%. Finally, the inclusions in the molten steel are removed by vacuum refining through an RH vacuum furnace, the molten steel is treated for 20 minutes in a high vacuum environment with a vacuum degree ≤1.5 mbar in a vacuum chamber of the RH vacuum furnace, and then killing treatment is performed for 15 minutes.

In the inclusion removal procedure, tapped molten steel obtained by external refining is transferred to a tundish with an electromagnetic induction heating function. An electromagnetic induction coil is controlled to achieve a voltage of 500 V, a frequency of 600 Hz and a heating rate of 3° C./min. A superheat degree is 15-18° C. The molten steel is further purified under an electromagnetic centrifugal force. Finally, high-purity molten steel is obtained. In the molten steel, inclusions in sizes ≥5 μm are at a number density of 0.2/mm², sizes of inclusions are ≤30 and the inclusions contain ≥50% of $SiO_2$, ≤30% of CaO and ≤10% of $Al_2O_3$.

(2) The Blank Casting Stage

The tapped molten steel of the steel smelting stage is cast into a continuously cast blank with a center carbon segregation value of 1.08. A specific process is as follows. The molten steel with the superheat degree of 15-18° C. obtained in the tundish with the electromagnetic induction heating function is poured into a continuous casting device to be processed into a continuously cast blank. A crystallizer of the continuous casting device has an electromagnetic stirring function so as to electromagnetically stir the poured molten steel to improve the proportion of equiaxed grains of the continuously cast blank. Specifically, the crystallizer is controlled to achieve a current of 800 A and a frequency of 3 Hz. Moreover, the continuous casting device uses an array withdrawal straightener and fan section capable of keeping a large reduction, thereby effectively controlling the center porosity and center segregation of the continuously cast blank. An implemented total reduction is 25 mm, and a total reduction ratio is 8%. Therefore, a highly pure and homogeneous continuously cast blank with a center carbon segregation value of 1.08 is finally obtained.

(3) The Cogging Stage

The continuously cast blank obtained in the blank casting stage is cogged into a highly pure and homogeneous intermediate blank with a center carbon segregation value of 1.05. A specific process is as follows.

In a first heating procedure, the continuously cast blank obtained in the blank casting stage is transferred to a first heating furnace for heating. A temperature of the first heating furnace is controlled to be 1,100° C. Total heating time is 130 minutes. A whole heating process is divided into a preheating section, a heating section and a soaking section at a temperature ≥1,080° C. The continuously cast blank is kept in the soaking section for 50 minutes. Therefore, diffusion heat treatment is performed on the continuously cast blank to further homogenize the continuously cast blank to improve the homogeneity.

In a continuous rolling cogging procedure, high-pressure water dephosphorization is performed under dephosphorization pressure of 12 MPa after the continuously cast blank leaves the first heating furnace. Then, the continuously cast blank is alternatively and continuously rolled into a 140 mm×140 mm square intermediate blank by a horizontal and vertical alternative continuous rolling mill of 9 passes. The continuously cast blank is at a temperature of 1,050° C. before entering a rolling mill of the first pass. The intermediate blank is naturally cooled and tapped, thereby obtaining the intermediate blank with the center carbon segregation value of 1.05.

(4) The Rolling Stage

Tapped steel of the cogging stage, i.e., the intermediate blank, is rolled into a wire rod. A specific process is as follows.

In a second heating procedure, the intermediate blank is transferred to a second heating furnace to be heated for 120 minutes. A temperature of the second heating furnace is controlled to be 1,100° C. The intermediate blank is kept in a soaking section at a temperature ≥1,080° C. for 45 minutes. The intermediate blank may be further homogenized in this process.

In a high-speed rolling procedure, high-pressure water dephosphorization is performed under dephosphorization pressure of 12 MPa after the intermediate blank leaves the second heating furnace. Then, the intermediate blank is rolled into the wire rod by a high-speed mill. An initial rolling temperature is controlled to be 1,030° C., a finish rolling temperature is controlled to be 920° C., a silking temperature is controlled to be 900° C., and a maximum rolling speed is controlled to be 100 m/s.

The second heating furnace and the first heating furnace may be the same heating furnace or two heating furnaces independent of each other.

(5) The Controlled Cooling Stage

Temperature control cooling is performed on the wire rod obtained by rolling in the rolling stage to finally obtain a high-purity, high-homogeneity and low-strength wire rod with no network cementite abnormal structures in the center and tensile strength of 1,150 MPa. A specific process is as follows. The wire rod obtained by rolling in the rolling stage enters a Stelmor cooling line for temperature control cooling after leaving a silking machine. A roll table speed of the Stelmor cooling line is controlled to be 0.9 m/s. $1^{st}$-$6^{th}$ fans are turned on. A heat preservation cover at a section of the Stelmor cooling line with the $1^{st}$ fan is closed. Openings of the $3^{rd}$-$6^{th}$ fans are controlled to be sequentially 50%, 40%, 30% and 20% to keep the cooling rate at 15 K/s. Moreover, a coil collection temperature is controlled to be 400° C. The wire rod enters a PF line to be naturally cooled after coil collection, so as to finally obtain the high-purity, high-homogeneity and low-strength wire rod with no network cementite abnormal structures in the center and the tensile strength of 1,150 MPa.

The wire rod manufactured in the present embodiment is measured to include the following chemical components in percentage by mass: 0.92% of C, 0.30% of Si, 0.60% of Mn, 0.01% of P, 0.01% of S, 0.001% of Al, 0.0002% of Ti, 0.005% of N, 0.3% of Cr, 0.003% of Ni, 0.003% of Cu, 0.005% of Mo, 0.005% of Nb, 0.02% of V, 0.005% of Sn, 0.01% of Pb, and the balance of Fe and other inevitable impurities.

It can be seen from the above that, in the wire rod, the inclusions in sizes ≥5 μm are at a number density of 0.2/mm², sizes of the inclusions are ≤30 μm, and the inclusions contain ≥50% of $SiO_2$, ≤30% of CaO and ≤10% of $Al_2O_3$. In addition, the center carbon segregation value of the intermediate blank for producing the wire rod is 1.05. Moreover, the wire rod has no network cementite abnormal structures in the center, and has the tensile strength of 1,150 MPa.

Furthermore, the wire rod of the present embodiment is obtained by existing procedures of drawing, heat treatment, zinc/copper plating, etc., so that an ultrahigh-strength steel cord with single tensile strength of 3,900 MPa may further be deeply processed, and low drawing fracture rate, low stranding fracture rate, low mold loss, high yield and the ease of drawing operations are ensured during deep processing.

What is claimed is:

1. A manufacturing method for a wire rod for an ultrahigh-strength steel cord, wherein the wire rod comprises the following chemical components in percentage by mass: 0.78%-0.96% of C, 0.15%-0.30% of Si, 0.30%-0.60% of Mn, ≤0.02% of P, ≤0.02% of S, ≤0.004% of Al, ≤0.001% of Ti, ≤0.005% of N, ≤0.50% of Cr, ≤0.05% of Ni, ≤0.05% of Cu, ≤0.01% of Mo, ≤0.10% of Nb, ≤0.10% of V, ≤0.01% of Sn, ≤0.02% of Pb, and the balance of Fe and other inevitable impurities, the manufacturing method sequentially comprising the following steps:
a steel smelting stage: smelting molten steel where inclusions in sizes ≥5 μm are at a number density≤0.5/mm² and sizes of inclusions are ≤30 μm;
a blank casting stage: casting tapped molten steel from the steel smelting stage into an ingot blank with a center carbon segregation value of 0.92-1.08;
a cogging stage: cogging the ingot blank into an intermediate blank with a center carbon segregation value of 0.95-1.05, wherein the cogging stage sequentially comprises:
a first heating procedure: heating the ingot blank in a first heating furnace for 100-150 minutes, a whole heating process is divided into a preheating section, a heating section and a soaking section at a temperature ≥1,080° C., and the ingot blank is kept in the soaking section for 30-60 minutes; and
a continuous rolling cogging procedure: high-pressure water dephosphorization is performed under dephosphorization pressure of 10-14 MPa after the ingot blank leaves the first heating furnace, then the ingot blank is alternatively and continuously rolled into the intermediate blank by 2-9 passes, the ingot blank is at a temperature of 980-1,080° C. before entering a rolling mill of the first pass;
a rolling stage: rolling the intermediate blank into a wire rod; and
a controlled cooling stage: performing temperature control cooling on the wire rod to obtain a wire rod with tensile strength ≤1,150 MPa.

2. The manufacturing method for a wire rod for an ultrahigh-strength steel cord according to claim 1, wherein the steel smelting stage sequentially comprises molten iron desulphurization, furnace primary smelting, external refining and inclusion removal; and in the furnace primary smelting procedure, no other slag formers but a carburant, ferrosilicon and manganese are sequentially added during tapping, and 90% or more of slag on a surface of the tapped molten steel is removed after tapping.

3. The manufacturing method for a wire rod for an ultrahigh-strength steel cord according to claim 2, wherein dephosphorization and decarburization are performed using a converter or an electric furnace before tapping in the furnace primary smelting procedure;

when dephosphorization and decarburization are performed using the converter, a weight of molten iron is 85%-95% of a total charge weight, dephosphorization is performed at first to obtain semi-steel molten iron containing ≤0.03% of P, then decarburization is performed, and the molten steel is controlled to be at a temperature ≥1,680° C. and contain ≤0.015% of P and ≥0.2% of C; or when dephosphorization and decarburization are performed using the electric furnace, the weight of the molten iron is 50%-90% of the total charge weight, and after dephosphorization and decarburization, the molten steel is controlled to be at a temperature ≥1,650° C. and contain ≤0.015% of P and ≥0.5% of C.

4. The manufacturing method for a wire rod for an ultrahigh-strength steel cord according to claim 2, wherein the external refining procedure sequentially comprises:
adjusting chemical components and temperature of the molten steel;
adding a refining covering agent to a surface of the molten steel according to a proportion of 8-12 kg/t, and melting the refining covering agent in an energized state to make a content of $SiO_2$ in the inclusions of the molten steel ≥40 mass %; and
removing the inclusions in the molten steel by soft stirring or vacuum refining.

5. The manufacturing method for a wire rod for an ultrahigh-strength steel cord according to claim 4, wherein the step of "adjusting chemical components and temperature of the molten steel" and the step of "adding a refining covering agent to a surface of the molten steel according to a proportion of 8-12 kg/t, and melting the refining covering agent in an energized state to make a content of $SiO_2$ in the inclusions of the molten steel ≥40 mass %" are performed in a ladle furnace (LF); and after the refining covering agent is added to the surface of the molten steel according to the proportion of 8-12 kg/t, a ladle bottom argon blowing intensity of the LF is controlled to be ≤0.005 $Nm^3/(t \cdot min)$ to make the content of $SiO_2$ in the inclusions of the molten steel ≥40 mass %, a content of CaO≤30 mass % and a content of $Al_2O_3$≤10 mass %.

6. The manufacturing method for a wire rod for an ultrahigh-strength steel cord according to claim 4, wherein in the step of "removing the inclusions in the molten steel by soft stirring or vacuum refining":

when the inclusions in the molten steel are removed by soft stirring, a ladle bottom argon blowing intensity of an LF is controlled to be 0.001 $Nm^3/(t \cdot min)$-0.005 $Nm^3$ $(t \cdot min)$, soft stirring time is ≥30 minutes, and then killing treatment is performed for 15-20 minutes;

when the inclusions are removed by vacuum refining through an RH vacuum furnace, the molten steel is treated for 15-25 minutes in a high vacuum environment with a vacuum degree ≤1.5 mbar in a vacuum chamber of the RH vacuum furnace, and then killing treatment is performed for 10-15 minutes; or when the inclusions are removed by vacuum refining through a vacuum decarburization (VD)/vacuum oxygen decarburization (VOD) furnace, the molten steel is treated for 15-25 minutes in a high vacuum environment with a vacuum degree ≤1.5 mbar in a vacuum chamber of the VD/VOD furnace, a ladle bottom argon blowing intensity of the VD/VOD furnace being 0.001 $Nm^3/(t \cdot min)$-0.005 $Nm^3/(t \cdot min)$, and then killing treatment is performed for 20-30 minutes.

7. The manufacturing method for a wire rod for an ultrahigh-strength steel cord according to claim 2, wherein in the inclusion removal procedure, tapped molten steel obtained by external refining is transferred to a tundish with an electromagnetic induction heating function, the inclusions in the molten steel are removed under an electromagnetic centrifugal force, and an electromagnetic induction coil is controlled to achieve a voltage of 200-1,500 V, a frequency of 300-800 Hz and a maximum heating rate of 3° C./min.

8. The manufacturing method for a wire rod for an ultrahigh-strength steel cord according to claim 1, wherein a superheat degree of the tapped molten steel of the steel smelting stage is 15-25° C.; and in the blank casting stage, the tapped molten steel of the steel smelting stage is poured into a continuous casting device to be processed into a continuously cast blank, a crystallizer of the continuous casting device has an electromagnetic stirring function so as to electromagnetically stir the poured molten steel, the crystallizer is controlled to achieve a current of 500 A-800 A and a frequency of 1 Hz-5 Hz, an array withdrawal straightener and fan section of the continuous casting device are used for forming the continuously cast blank, and the array withdrawal straightener has a single-roll reduction ≥5 mm, a total reduction ≥30 mm, the total reduction being controlled to be 10 mm-30 mm during implementation, and a total reduction ratio of 3%-10%.

9. The manufacturing method for a wire rod for an ultrahigh-strength steel cord according to claim 1, wherein in the first heating procedure, a temperature of the heating furnace is controlled to be 1,000-1,200° C.; and in the continuous rolling cogging procedure, the ingot blank is alternatively and continuously rolled into the intermediate blank by a horizontal and vertical alternative continuous rolling mill of 2-9 passes, and the intermediate blank is cooled and tapped.

10. The manufacturing method for a wire rod for an ultrahigh-strength steel cord according to claim 1, wherein the rolling stage sequentially comprises a second heating procedure and a high-speed rolling procedure, so as to roll the intermediate blank into the wire rod;

in the second heating procedure, the intermediate blank is transferred to a second heating furnace to be heated for 90-150 minutes, a temperature of the second heating furnace is controlled to be 1,000-1,150° C., and the intermediate blank is kept in a soaking section at a temperature ≥1,050° C. for 30-60 minutes; and in the high-speed rolling procedure, high-pressure water dephosphorization is performed under dephosphorization pressure of 9-14 MPa after the intermediate blank leaves the second heating furnace, then the intermediate blank is rolled into the wire rod by a high-speed mill, an initial rolling temperature is controlled to be 950-1,050° C., a finish rolling temperature is controlled to be 900-940° C., a silking temperature is controlled to be 900-940° C., and a maximum rolling speed is controlled to be 110 m/s.

11. The manufacturing method for a wire rod for an ultrahigh-strength steel cord according to claim 1, wherein in the controlled cooling stage, temperature control cooling is performed on the wire rod at a cooling rate of 8-18 K/s, the cooling rate is reduced to 4-8 K/s after cooling to 600° C., and the obtained wire rod has no network cementite or martensite abnormal structures in the center, and has tensile strength ≤1,150 MPa.

12. The manufacturing method for a wire rod for an ultrahigh-strength steel cord according to claim 11, wherein in the controlled cooling stage, temperature control cooling is performed on the wire rod using a Stelmor cooling line, a roll table speed of the Stelmor cooling line is controlled to be ≤1.05 m/s, $1^{st}$-$6^{th}$ fans are turned on, and maximum openings of the $3^{rd}$-$6^{th}$ fans are controlled to be 50% to keep the cooling rate at 8-18 K/s; and a coil collection temperature is controlled to be ≤450° C., and the wire rod enters a power and free (PF) line to be naturally cooled after coil collection.

13. The manufacturing method for a wire rod for an ultrahigh-strength steel cord according to claim 12, wherein in the controlled cooling stage, the roll table speed of the Stelmor cooling line is controlled to be 0.7-0.9 m/s, a heat preservation cover at a section of the Stelmor cooling line with the $1^{st}$ fan is closed, and best openings of the $3^{rd}$-$6^{th}$ fans are sequentially 20-50%, 10-40%, 30% or less, and 20% or less respectively.

14. A manufacturing method for a wire rod for an ultrahigh-strength steel cord, wherein the wire rod comprises the following chemical components in percentage by mass: 0.78%-0.96% of C, 0.15%-0.30% of Si, 0.30%-0.60% of Mn, ≤0.02% of P, ≤0.02% of S, ≤0.004% of Al, ≤0.001% of Ti, ≤0.005% of N, ≤0.50% of Cr, ≤0.05% of Ni, ≤0.05% of Cu, ≤0.01% of Mo, ≤0.10% of Nb, ≤0.10% of V, ≤0.01% of Sn, ≤0.02% of Pb, and the balance of Fe and other inevitable impurities, the manufacturing method sequentially comprising the following steps:

a steel smelting stage: smelting molten steel where inclusions in sizes ≥5 μm are at a number density ≤0.5/mm² and sizes of inclusions are ≤30 μm;

a blank casting stage: casting tapped molten steel from the steel smelting stage into an ingot blank with a center carbon segregation value of 0.92-1.08;

a cogging stage: cogging the ingot blank into an intermediate blank with a center carbon segregation value of 0.95-1.05;

a rolling stage: rolling the intermediate blank into a wire rod; the rolling stage sequentially comprises:

a second heating procedure: heating the intermediate blank in a second heating furnace for 90-150 minutes, and the intermediate blank is kept in a soaking section at a temperature ≥1,050° C. for 30-60 minutes; and a high-speed rolling procedure: high-pressure water dephosphorization is performed under dephosphorization pressure of 9-14 MPa after the intermediate blank leaves the second heating furnace, then the intermediate blank is rolled into the wire rod by a high-speed mill, an initial rolling temperature is controlled to be 950-1,050° C., a finish rolling temperature is controlled to be 900-940° C., a silking temperature is controlled to be 900-940° C., and a maximum rolling speed is controlled to be 110 m/s;

and a controlled cooling stage: performing temperature control cooling on the wire rod to obtain a wire rod with tensile strength ≤1,150 MPa.

15. The manufacturing method for a wire rod for an ultrahigh-strength steel cord according to claim 14, wherein the steel smelting stage sequentially comprises molten iron desulphurization, furnace primary smelting, external refining and inclusion removal;

in the furnace primary smelting procedure, no other slag formers but a carburant, ferrosilicon and manganese are sequentially added during tapping, and dephosphorization and decarburization are performed using a converter or an electric furnace before tapping;

when dephosphorization and decarburization are performed using the converter, a weight of molten iron is 85%-95% of a total charge weight, dephosphorization is performed at first to obtain semi-steel molten iron containing ≤0.03% of P, then decarburization is performed, and the molten steel is controlled to be at a temperature ≥1,680° C. and contain ≤0.015% of P and ≥0.2% of C; or when dephosphorization and decarburization are performed using the electric furnace, the weight of the molten iron is 50%-90% of the total charge weight, and after dephosphorization and decarburization, the molten steel is controlled to be at a temperature ≥1,650° C. and contain ≤0.015% of P and ≥0.5% of C.

16. The manufacturing method for a wire rod for an ultrahigh-strength steel cord according to claim 14, wherein the steel smelting stage sequentially comprises molten iron desulphurization, furnace primary smelting, external refining and inclusion removal;

the external refining procedure sequentially comprises:

adjusting chemical components and temperature of the molten steel;

adding a refining covering agent to a surface of the molten steel according to a proportion of 8-12 kg/t, and melting the refining covering agent in an energized state to make a content of $SiO_2$ in the inclusions of the molten steel ≥40 mass %; and removing the inclusions in the molten steel by soft stirring or vacuum refining;

in the inclusion removal procedure, tapped molten steel obtained by external refining is transferred to a tundish with an electromagnetic induction heating function, the inclusions in the molten steel are removed under an electromagnetic centrifugal force.

17. The manufacturing method for a wire rod for an ultrahigh-strength steel cord according to claim 14, wherein a superheat degree of the tapped molten steel of the steel smelting stage is 15-25° C.

18. The manufacturing method for a wire rod for an ultrahigh-strength steel cord according to claim 16, wherein the cogging stage sequentially comprises:

a first heating procedure: heating the ingot blank in a first heating furnace for 100-150 minutes, a whole heating process is divided into a preheating section, a heating section and a soaking section at a temperature ≥1,080° C., and the ingot blank is kept in the soaking section for 30-60 minutes; and a continuous rolling cogging procedure: high-pressure water dephosphorization is performed under dephosphorization pressure of 10-14 MPa after the ingot blank leaves the first heating furnace, then the ingot blank is alternatively and continuously rolled into the intermediate blank by 2-9 passes, the ingot blank is at a temperature of 980-1,080° C. before entering a rolling mill of the first pass.

19. The manufacturing method for a wire rod for an ultrahigh-strength steel cord according to claim 14, wherein in the controlled cooling stage, temperature control cooling is performed on the wire rod using a Stelmor cooling line at a cooling rate of 8-18 K/s, the cooling rate is reduced to 4-8 K/s after cooling to 600° C.; a coil collection temperature is controlled to be ≤450° C., and the wire rod enters a power and free (PF) line to be naturally cooled after coil collection.

* * * * *